(12) United States Patent
Jin et al.

(10) Patent No.: US 10,118,153 B1
(45) Date of Patent: Nov. 6, 2018

(54) GAS ABSORBENT PARTICLE AND METHOD FOR MAKING SAME

(71) Applicant: AAC Technologies Pte. Ltd., Singapore (SG)

(72) Inventors: Yanyan Jin, Shenzhen (CN); Ning Kang, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 0 days.

(21) Appl. No.: 16/056,642

(22) Filed: Aug. 7, 2018

(51) Int. Cl.
| | | |
|---|---|---|
| *H04R 1/20* | (2006.01) | |
| *B01J 20/00* | (2006.01) | |
| *B01J 20/20* | (2006.01) | |
| *B01J 20/26* | (2006.01) | |
| *B01J 20/02* | (2006.01) | |
| *B01J 20/22* | (2006.01) | |
| *B01J 20/28* | (2006.01) | |
| *H04R 1/28* | (2006.01) | |
| *B01J 20/30* | (2006.01) | |
| *H04R 1/02* | (2006.01) | |

(52) U.S. Cl.
CPC ............ *B01J 20/261* (2013.01); *B01J 20/02* (2013.01); *B01J 20/22* (2013.01); *B01J 20/2803* (2013.01); *B01J 20/28004* (2013.01); *B01J 20/28016* (2013.01); *B01J 20/3042* (2013.01); *H04R 1/025* (2013.01); *H04R 1/2888* (2013.01)

(58) Field of Classification Search
CPC . B01J 20/261; B01J 20/02; B01J 20/22; B01J 20/28004; B01J 20/28016; B01J 20/2803; B01J 20/3042; H04R 1/025; H04R 1/2888
USPC ......................................................... 381/354
See application file for complete search history.

(56) References Cited

U.S. PATENT DOCUMENTS

| | | | |
|---|---|---|---|
| 2005/0112056 A1* | 5/2005 | Hampden-Smith | .... B01J 20/041 423/651 |
| 2013/0102461 A1* | 4/2013 | Akiyama | .......... A61F 13/15617 502/402 |
| 2016/0309254 A1* | 10/2016 | Lembacher | .............. H04R 1/28 |
| 2017/0195781 A1* | 7/2017 | Kang | ....................... B01J 20/18 |

FOREIGN PATENT DOCUMENTS

| | | | | |
|---|---|---|---|---|
| CN | 102150943 B | * | 12/2012 | ............... A24B 3/14 |
| CN | 103084139 A | * | 5/2013 | .............. B01J 20/08 |
| CN | 103878371 A | * | 6/2014 | .............. B22F 3/115 |
| CN | 105400479 A | * | 3/2016 | ............ C09J 175/04 |

* cited by examiner

*Primary Examiner* — Sean H Nguyen
(74) *Attorney, Agent, or Firm* — Na Xu; IPro, PLLC

(57) ABSTRACT

The present application discloses method for making air adsorbent particles. The method includes the steps of: providing and mixing porous powder, water, adhesive, and additive agent for obtaining sizing agent; obtaining air adsorbent particles by spray shaping, drying, and screening the sizing agent. The mass ratio between the porous powder, water, adhesive and the additive agent is 1:(0.5~8):(0.01~0.16):(0.001~0.15). Particles obtained by the method of the present application have higher strength.

10 Claims, 2 Drawing Sheets

```
providing and mixing porous powder,
water, adhesive, and additive agent for    ─── S1
obtaining sizing agent

↓ obtaining air adsorbent particles by spray
shaping, drying, and screening the sizing  ─── S2
agent
```

GAS ABSORBENT PARTICLE AND METHOD FOR MAKING SAME

FIELD OF THE PRESENT DISCLOSURE

This disclosure related to the field of electro-acoustic transducers, and more particularly to gas absorbent particles used in a speaker for providing audible sounds, and to a method for making such gas adsorbent particles.

DESCRIPTION OF RELATED ART

Mobile phones are widely and popularly used portable electronic devices. One of the attractive functions of the mobile phones is high performance music play back. In order to achieve the above mentioned function, speaker boxes are normally equipped in the mobile phones to convert electrical signals into audible sound waves. Speaker boxes with gas adsorbent materials for providing better acoustic performance are now more and more popular.

A related speaker box generally includes a housing having an accommodating space for receiving a speaker therein. The speaker divides the accommodating space into a front cavity and a rear cavity. The rear cavity is filled with gas adsorbent particles for adsorbing gas in the rear cavity in order to improve the compliance of the air, by which the resonance frequency at low frequency is reduced, and low frequency performance of the speaker box is accordingly improved.

However, the gas absorbent particles are made by powders, water and adhesive, so the strength of the particle is relatively low. The particle in the cavity will impact with the sidewall forming the cavity and will be broken. The broken powders will then enter the front cavity, which will badly affect the acoustic performance of the speaker box.

Therefore it is necessary to provide an improved speaker box for overcoming the above-mentioned disadvantages.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
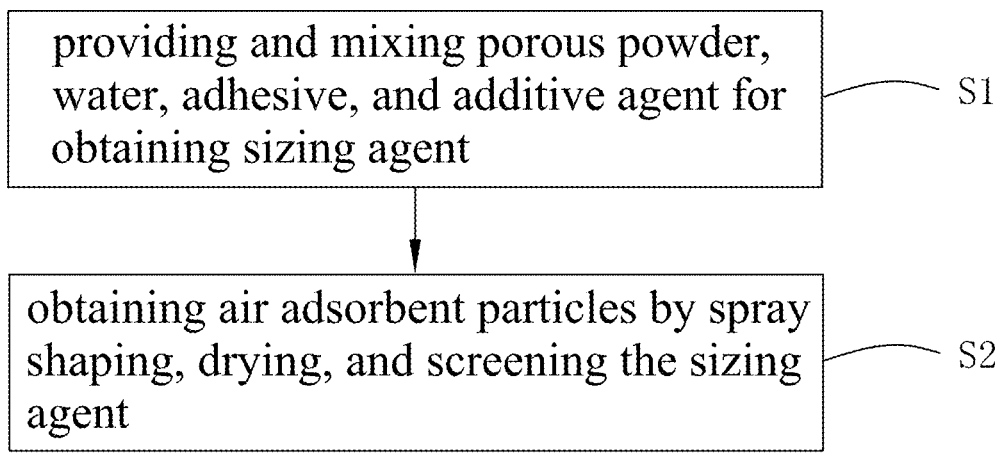
FIG. 1 is a flow chart of a method for making gas adsorbent particles, in accordance with an exemplary embodiment of the present disclosure.

Referring to FIG. 1, a flow chart of a method for making gas adsorbent particles in shown. The method includes the steps of:

Step 1: Providing and mixing porous powder, water, adhesive, and additive agent for obtaining sizing agent;

wherein the mass ratio between the porous powder, water, adhesive and the additive agent is 1:(0.5~8):(0.01~0.16): (0.001~0.15);

wherein the porous powder may be molecular sieve;

wherein the adhesive may comprise polyvinyl alcohol solution, polystyrene acrylate emulsion, polyvinyl acetate-acrylate emulsion, ylate emulsion, polyethylene-vinyl acetate emulsion, polystyrene latex, polyvinyl pyrrolidone water solvent, polyacrylic hydrosol, polybutadiene-styrene emulsion, or polyacrylamide aqueous solution; preferably, the adhesive is polystyrene acrylate emulsion and/or polyvinyl acetate-acrylate emulsion;

wherein the additive comprises tween (e.g. tween 20, or tween 80), glyceride (e.g. Polyglycerol-2-triiso-stearate), or polyhydric alcohols (e.g. polyethylene glycol or sorbitol), and preferably, the additive is polyhydric alcohols; in this embodiment, the mass ratio between the porous powder, water, adhesive and the additive agent is 1:(0.7~4): (0.03~0.1):(0.005~0.07);

Step 2: Obtaining air adsorbent particles by spray shaping, drying, and screening the sizing agent.

By the method described above, air adsorbent particle with dimeters ranged between 350 micrometer and 450 micrometer have been made.

The present disclosure also provides air adsorbent particles made by the method mentioned above, and air adsorbent particles comprise porous powder, water, adhesive and the additive agent with mass ratio therebetween 1:(0.7~4): (0.03~0.1):(0.005~0.07).

Specifically, the air adsorbent particles can be made by mixing molecular sieve, water, polyacrylate emulsion, and tween 20 with the mass ratio 1:1.5:0.09:0.005, and after spray shaping, drying screening, particles with diameters ranged 350 micrometer~450 micrometer are obtained.

Or specifically, the air adsorbent particles can be made by mixing molecular sieve, water, polyacrylate emulsion, and polyglycerol-2-triiso-stearate with the mass ratio 1:1.5:0.09: 0.02, and after spray shaping, drying screening, particles with diameters ranged 350 micrometer~450 micrometer are obtained.

Or specifically, the air adsorbent particles can be made by mixing molecular sieve, water, polyacrylate emulsion, and polyethylene glycol with the mass ratio 1:1.5:0.09:0.04, and after spray shaping, drying screening, particles with diameters ranged 350 micrometer~450 micrometer are obtained.

The air adsorbent particles made by the method of the present application have high strength compared with related particles.

Figure 2:
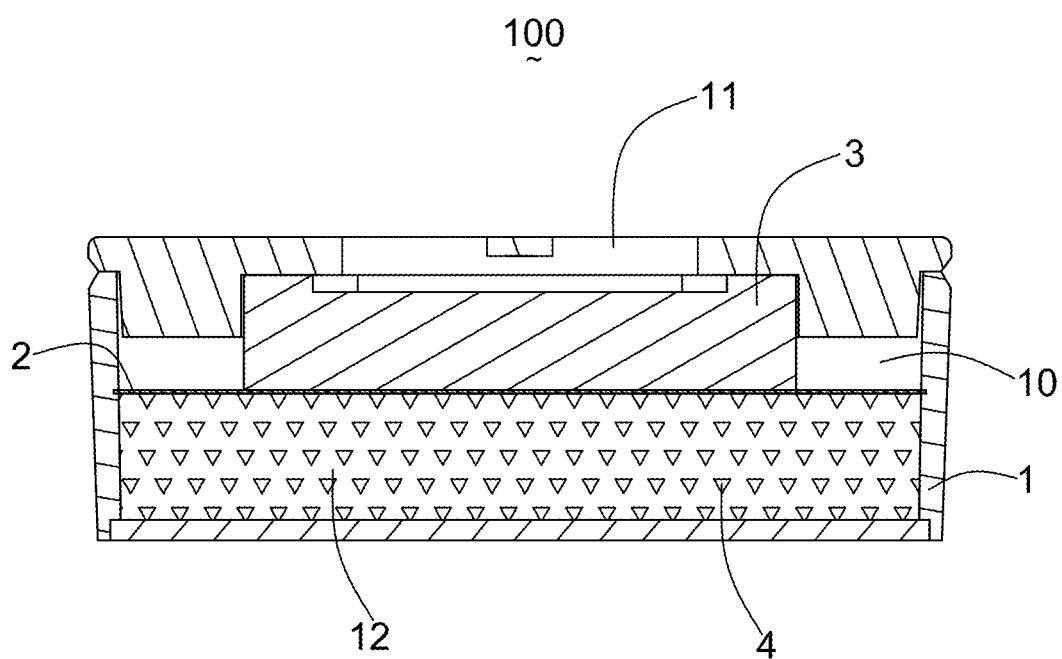
FIG. 2 is a cross-sectional view of a speaker box using the gas adsorbent particles obtained by the method shown in FIG. 1.

Referring to FIG. 2, the present application further provides a speaker box 100 having a housing with an accommodating space 10, a spacer 2 in the accommodating space 10, and a speaker 3 received in the accommodating space 10. The spacer 2 divides the accommodating space 10 into a front cavity 11 and a rear cavity 12. The speaker 3 is received in the front cavity 11. Further, the speaker box 100 includes air adsorbent particles 4 described above. The particles 4 are filled in the rear cavity 12.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A method for making air adsorbent particles, comprising the steps of:
   providing and mixing porous powder, water, adhesive, and additive agent for obtaining sizing agent;
   obtaining air adsorbent particles by spray shaping, drying, and screening the sizing agent;
   wherein the mass ratio between the porous powder, water, adhesive and the additive agent is 1:(0.5~8):(0.01~0.16):(0.001~0.15).

2. The method for making air adsorbent particles as described in claim 1, wherein the porous powder comprises a molecular sieve.

3. The method for making air adsorbent particles as described in claim 1, wherein the adhesive comprises at least one of a polyvinyl alcohol solution, a polystyrene acrylate emulsion, a polyvinyl acetate-acrylate emulsion, an ylate emulsion, a polyethylene-vinyl acetate emulsion, a polystyrene latex, a polyvinyl pyrrolidone water solvent, a polyacrylic hydrosol, a polybutadiene-styrene emulsion, and a polyacrylamide aqueous solution.

4. The method for making air adsorbent particles as described in claim 3, wherein the adhesive is polystyrene acrylate emulsion and/or polyvinyl acetate-acrylate emulsion.

5. The method for making air adsorbent particles as described in claim 1, wherein the additive comprises tween, glyceride, or polyhydric alcohols.

6. The method for making air adsorbent particles as described in claim 5, wherein the tween is tween 20 or tween 80, the glyceride is polyglycerol-2-triiso-stearate, and the polyhydric alcohol is polyethylene glycol or sorbitol.

7. The method for making air adsorbent particles as described in claim 1, wherein the mass ratio between the porous powder, water, adhesive and the additive agent is 1:(0.7~4):(0.03~0.1):(0.005~0.07).

8. Air adsorbent particles, wherein the particles are made by the method claimed in claim 1.

9. The air adsorbent particles as described in claim 8, wherein dimeters of the particles are ranged 350 micrometer~450 micrometer.

10. A speaker box having a housing with an accommodating space, a spacer in the housing for dividing the accommodating space into a front cavity and a rear cavity, and a speaker received in the front cavity of the accommodating space, wherein the speaker box further comprises air adsorbent particles as described in claim 8, and the particles are filled in the rear cavity.

* * * * *